Patented Jan. 10, 1939

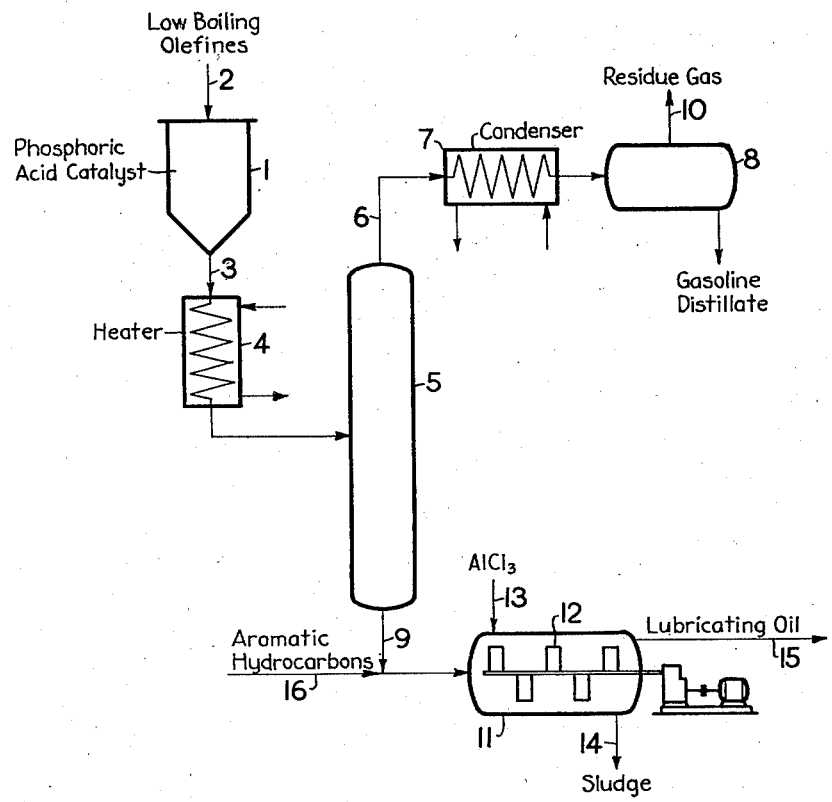

2,143,566

UNITED STATES PATENT OFFICE 2,143,566

PROCESS FOR THE MANUFACTURE OF LUBRICANTS

Franz Rudolf Moser, Amsterdam, Netherlands, assignor to Shell Development Company, San Francisco, Calif., a corporation of Delaware Application February 15, 1937, Serial No. 125,830
In the Netherlands March 25, 1936

10 Claims. (Cl. 196—10)

My invention deals with the polymerization of low-boiling olefines, particularly normally gaseous olefines, to produce synthetic lubricating oils having high viscosity indexes.

It is generally known that lubricating oils produced by polymerization of low-boiling olefines such as the normally gaseous olefines usually possess relatively low viscosity indexes, considerably lower than those obtainable, for instance, by polymerizing normally liquid, straight chain olefines having about 6 to 20 carbon atoms. Moreover, the yield of suitable lubricating oils from normally gaseous olefines is usually quite low, the polymerization either having a tendency to go to rubber-like materials as in the polymerization of isobutylene with boron fluoride, or to polymers of the gasoline, kerosene, or gas oil type, as in the presence of phosphoric acid, sulfuric acid, adsorptive clays, etc.

The desirability of utilizing normally gaseous olefines for the production of lubricating oils has long been recognized, since these olefines are available in large quantities as by-products from cracking operations, whereas the normally liquid straight chain olefines must be prepared specially, for instance, by cracking wax in the vapor phase.

It is a purpose of this invention to provide a process whereby normally gaseous olefines are converted to lubricating oils having viscosity indexes comparable to those produced in the polymerization of normally liquid straight chain olefines, and it is another purpose to utilize relatively heavy polymers produced as by-products in the catalytic polymerization of normally gaseous olefines to gasoline for the production of lubricating oils.

The invention consists essentially of catalytically polymerizing low-boiling olefines at relatively high temperatures normally above 125° C., but below temperatures at which substantial cracking will occur in the presence of the particular catalyst used, under superatmospheric pressures, to convert a substantial portion thereof to a gasoline type liquid consisting of gasoline and heavier hydrocarbons, fractionally distilling the polymers so obtained to separate a relatively light gasoline fraction and a heavier fraction, and further polymerizing this heavier fraction with a halide catalyst at an effective polymerization temperature below 125° C. and at pressures lower than that of the first polymerization.

The gasoline type liquid of the first polymerization may consist predominantly of gasoline and contain a relatively small portion of heavier hydrocarbons, or it may consist predominantly of hydrocarbons heavier than gasoline. It is preferably free from components suitable as lubricating oils, the heavier than gasoline hydrocarbons being advantageously of the kerosene or gas-oil type, boiling not above about 400° C. at normal pressures.

Suitable olefines for the first polymerization are found in cracking still gases, in the tops of stabilizers operating on cracked gasolines, and in the light ends of cracked gasolines, etc. Depending upon the types and relative proportions of olefines contained in the initial treating material, the properties of the lubricating oils finally produced may vary considerably. For instance, I have found that I obtain lubricating oils of higher viscosity indexes when using for the first polymerization a mixture of olefines such as propylene and butylenes than when using butylenes alone. Excellent results were obtained with cracked gases produced, for instance, in the vapor phase cracking of paraffin wax and from which the 2-carbon hydrocarbons and lighter gases have been removed. In general, hydrocarbon mixtures containing substantial quantities of olefines of 3 to 6 carbon atoms are very suitable. The presence of lower and higher olefines may, however, be permissible under circumstances in which they do not cause operating difficulties.

Catalysts for the first polymerization may be selected from any of the known polymerization catalysts capable of converting normally gaseous olefines to gasoline type hydrocarbons. Particularly useful catalysts are the polybasic acids and especially acids of phosphorus ($H_3PO_4$, $H_4P_2O_7$, $HPO_3$, $H_2P_2O_5$, $H_3PO_3$, $H_3PO_2$) and their anhydrides, as $P_2O_5$. I may also use such acids as sulfuric, benzene sulfonic, arsenic, silicic acids, silica gel; or acid-reacting salts of these acids and metals like zinc, aluminum, cadmium, lead, bismuth, etc., salts, or the monobasic alkali or alkaline earth salts; or acid-reacting clays; or mixtures or reaction products of two or more of the above compounds. Halide catalysts as, for example, aluminum chloride, aluminum bromide, boron fluoride, zinc chloride, titanium chloride, ferric chloride, tin chloride, bismuth oxychloride, etc., may also be used under non-cracking conditions at relatively elevated temperatures substantially to yield polymers of low viscosity, although their use is less desirable in this stage of the process than that of acids of phosphorus.

The polymers obtained in this first polymerization, about 90% of which may boil below about 220° C., are then fractionated. The fractionation may be carried out to produce a low-boiling fraction suitable for gasoline, normally boiling below about 200° C., and a higher boiling fraction; or it may be distilled to separate certain relatively low-boiling fractions having especially high anti-knock properties and other intermediate and higher boiling fractions having lower octane numbers. The heavier or low octane number fractions, as the case may be, are then subjected to the second polymerization.

Normally, it is of advantage not to include in this second polymerization relatively low-boiling fractions because of their effect of lowering the viscosity index of the resulting synthetic lubricating oil. Since the nature of the polymer may vary considerably depending upon the composition of the initial material, the conditions of the first polymerization and the type of catalyst used, the exact characteristics of the various fractions which produce the most desirable combination of high antiknock gasoline on the one hand and high viscosity index lubricating oil on the other hand must be determined experimentally for each case. In general, I prefer to use a fraction for the second polymerization having an initial boiling point above 150° C., and preferably not below 175° C. Its end boiling point, while not definitely limited and varying within wide limits depending upon the properties of the product of the first polymerization, is preferably not above about 400° C.

If desired, a moderate amount of aromatic hydrocarbons, such as benzene, naphthalene, gasolene produced by high temperature thermal polymerization, mineral oil fraction of the type of Edeleanu extracts rich in aromatic hydrocarbons, and the like, may be added to the heavy fraction to be subjected to the second polymerization. The addition of small amounts of aromatic hydrocarbons appears to increase the oxidation stability of the resulting lubricating oil. Proportions of aromatics in excess of about 20% should, however, be avoided, because they have an adverse effect on the viscosity indexes of the synthetic lubricating oils.

For attaining the best yield and quality of the final product, the second polymerization must be carried out in contact with a halide catalyst, such as aluminum chloride, boron fluoride, beryllium fluoride, zinc chloride, ferric chloride, titanium chloride, etc., at a relatively low temperature below 125° C., and preferably between about normal room temperature and 120° C. Of the above catalysts, aluminum chloride appears to produce highest yields of the desired lubricating oils. If desired, this polymerization can be accelerated by the presence of certain metals as nickel, aluminum, zinc; or a halogen hydride or a compound capable of liberating halogen hydride under the conditions of the polymerization, for instance, a tertiary aliphatic chloride, or a small amount of water, or a mono- or polyhydric alcohol. Again the presence of compounds capable of forming complex compounds with halide catalysts such as lower nitro hydrocarbons, ketones, etc., or inorganic substantially inactive halides as sodium chloride, silver chloride, lead chloride, etc., may be of advantage.

This second polymerization is continued for a period of several hours until the desired oil has been produced. The catalyst sludge is then separated by conventional means. The resulting polymer is neutralized and distilled under vacuum and/or with steam to separate components of lower viscosity from a fraction having the properties of a lubricating oil. If desired, this oil may be further refined by hydrogenation or any other conventional refining treatment as, for instance, treating with sulfuric acid, adsorptive clay, etc. The finished oil may then be used for lubrication alone or in blends with other synthetic or natural lubricating oils.

Referring to the attached drawing which represents a simplified flow diagram of my process, low-boiling olefines are introduced at the desired temperature into catalyst chamber 1 through line 2 from a source not shown. Chamber 1 contains a polymerization catalyst such as a phosphoric acid catalyst suitable for converting the low-boiling olefines to gasoline hydrocarbons. Polymers from this polymerization step emerge through line 3 and pass through heater 4 into fractionating column 5 where they are fractionally distilled into a top fraction which proceeds through vapor line 6 and condenser 7 into receiving vessel 8, and a bottom fraction which is withdrawn through line 9. Residue vapors from the condensation in condenser 7 are vented from tank 8 through line 10.

The bottom fraction from the fractional distillation is conveyed through line 9 into reaction vessel 11. This vessel is of any conventional design and may, for instance, contain a mechanical stirrer 12. The vessel is equipped with feed line 13 for a catalyst such as aluminum chloride. The catalyst and the polymer fraction from line 9 are reacted under conditions to produce a lubricating oil, catalyst sludge being removed through line 14 and lubricating oil emerging through line 15.

If desired, aromatic hydrocarbons may be introduced into the reaction vessel 11 through the 16.

The following example serves to illustrate my invention.

A gas from a cracking process containing mixed olefines consisting essentially of propylene and butylenes was polymerized with a phosphoric acid-kieselguhr catalyst under a pressure of 10 to 15 atmospheres at temperatures between 200° to 250° C. About 90% of the olefines were converted to a gasoline type liquid which was fractionated. 87½% boiled below 180° C. constituting a high antiknock gasoline and the remaining 12½% boiled between 180° and 300° C. This remaining fraction was contacted with 4% anhydrous aluminum chloride for 5 hours at 100° C. at atmospheric pressure. A polymer was obtained, 29% of which, calculated on the fraction boiling above 180° C., constituted a lubricating oil having a Saybolt Universal viscosity at 50° C. of 265 seconds, and a viscosity index of 101.

The fraction boiling below 180° C. was then polymerized under identical conditions, yielding 11%, calculated on this fraction, of a polymer having a Saybolt Universal viscosity at 50° C. of 260 seconds and a viscosity index of 57.

I claim as my invention:

1. In the process of producing synthetic lubricating oil of high viscosity index by polymerization of low boiling olefines comprising predominantly 3 to 6 carbon olefines, the improvement comprising polymerizing said low boiling olefines at an elevated non-cracking temperature with a polymerizing catalyst capable of converting normally gaseous olefines to gasoline hydrocarbons to produce a liquid polymer which consists essentially of gasoline and higher boiling hydrocarbons and which is substantially free from lubricating oil components, fractionally distilling said polymer to separate a low boiling normally liquid polymer fraction boiling below about 200° C., and a higher boiling fraction, further polymerizing the higher boiling fraction with an active halide polymerization catalyst at an effective polymerization temperature below about 125° C., to convert a portion of said higher boiling fraction to lubricating oil and separating said lubricating oil.

2. In the process of producing synthetic lubricating oil of high viscosity index by polymerization of low boiling olefines comprising predominantly 3 to 6 carbon olefines, the improvement comprising polymerizing said low boiling olefines at a non-cracking temperature above 125° C. with a catalyst comprising a polybasic mineral acid to produce a liquid polymer which consists essentially of gasoline and higher boiling hydrocarbons and which is substantially free from lubricating oil components, fractionally distilling said polymer to separate a low boiling normally liquid polymer fraction boiling below about 200° C., and a higher boiling fraction boiling above 150° C. further polymerizing the higher boiling fraction with aluminum chloride at an effective polymerization temperature below about 125° C., to convert a portion of said higher boiling fraction to lubricating oil and separating said lubricating oil.

3. In the process of producing a synthetic lubricating oil of high viscosity index by polymerization of low boiling olefines comprising predominately normally gaseous olefines, the steps comprising catalytically polymerizing said olefines at a non-cracking temperature under conditions to convert same to a gasoline polymer which contains substantial amounts of components heavier than gasoline and lighter than lubricating oil and which is substantially free from lubricating oil components, fractionally distilling said polymer to produce a low boiling gasoline fraction and a higher boiling fraction substantially boiling below lubricating oil, and further catalytically polymerizing said higher boiling fraction under conditions to produce a lubricating oil.

4. In the process of producing a synthetic lubricating oil of high viscosity index by polymerization of low boiling olefines comprising predominantly normally gaseous olefines, the steps comprising catalytically polymerizing said olefines at a non-cracking temperature under conditions to convert same to a gasoline polymer which contains substantial amounts of components heavier than gasoline and lighter than lubricating oil and which is substantially free from lubricating oil components, fractionally distilling said polymer to produce at least two normally liquid fractions, one being a low boiling gasoline fraction, and the other a higher boiling fraction substantially boiling above 150° C. and below lubricating oil, and further catalytically polymerizing said higher boiling fraction under conditions to produce a lubricating oil.

5. In the process of producing a synthetic lubricating oil of high viscosity index by polymerization of a mixture of propylene and butylenes, the steps comprising catalytically polymerizing said mixture at a non-cracking temperature under conditions to convert same to a gasoline polymer which contains substantial amounts of components heavier than gasoline and lighter than lubricating oil and which is substantially free from lubricating oil components, fractionally distilling said polymer to produce a normally liquid low boiling gasoline fraction and a higher boiling fraction substantially boiling below lubricating oil, and further catalytically polymerizing said higher boiling fraction under conditions to produce a lubricating oil.

6. The process of claim 1 in which the low-boiling olefines consists essentially of a mixture of 3 to 6 carbon olefines.

7. The process of claim 1 in which the low-boiling olefines consist essentially of a mixture of normally gaseous olefines.

8. The process of claim 1 in which the low-boiling olefines are polymerized at a non-cracking temperature above 125° C.

9. The process of claim 1 in which the higher boiling fraction has an initial boiling point above 175° C.

10. In the process of producing synthetic lubricating oil of high viscosity index by polymerization of low-boiling olefines comprising predominately 3 to 6 carbon olefines, the improvement comprising polymerizing said low-boiling olefines at an elevated non-cracking temperature with a polymerizing catalyst capable of converting normally gaseous olefines to gasoline hydrocarbons, to produce a liquid polymer consisting essentially of gasoline and higher boiling hydrocarbons, fractionally distilling said liquid to separate a low-boiling polymer fraction boiling below about 200° C., and a higher-boiling fraction, adding to said higher-boiling fraction not more than about 20% aromatic hydrocarbons, further polymerizing the resulting moxture with an active halide catalyst at an effective polymerization temperature below about 125° C., to convert a portion of said higher boiling fraction to viscous oil and separating said viscous oil.

FRANZ RUDOLF MOSER.